United States Patent [19]

Kelland

[11] Patent Number: 4,901,365

[45] Date of Patent: Feb. 13, 1990

[54] METHOD OF SEARCHING BINARY IMAGES TO FIND SEARCH REGIONS IN WHICH STRAIGHT LINES MAY BE FOUND

[75] Inventor: Stewart B. Kelland, Waterloo, Canada

[73] Assignee: NCR Corporation, Dayton, Ohio

[21] Appl. No.: 286,411

[22] Filed: Dec. 19, 1988

[51] Int. Cl.[4] ............................................. G06K 9/00
[52] U.S. Cl. ...................................... 382/61; 382/48; 382/24; 358/453
[58] Field of Search ............................ 382/61, 48, 24; 358/453

[56] References Cited

U.S. PATENT DOCUMENTS

| | | | |
|---|---|---|---|
| 3,930,237 | 12/1975 | Villers | 340/172.5 |
| 4,044,327 | 8/1977 | Holm et al. | 235/61.7 R |
| 4,504,969 | 3/1985 | Suzuki et al. | 382/10 |
| 4,516,266 | 5/1985 | Christopher et al. | 382/48 |
| 4,566,126 | 1/1986 | Miyagawa et al. | 382/48 |
| 4,589,144 | 5/9186 | Namba | 382/61 |
| 4,728,784 | 3/1988 | Stewart | 235/462 |
| 4,748,678 | 5/1988 | Takeda et al. | 382/56 |
| 4,776,024 | 10/1988 | Katoh et al. | 382/488 |

Primary Examiner—Leo H. Boudreau
Assistant Examiner—Daniel Santos
Attorney, Agent, or Firm—Wilbert Hawk, Jr.; Albert L. Sessler, Jr.; Elmer Wargo

[57] ABSTRACT

A method of searching a matrix of binary data to find search regions in which straight lines may be found, with the straight lines being those which are perpendicular to the original direction of scanning which produced the matrix of binary data. The method comprises the steps: (a) determining a number of search scans to cover a predetermined area of the matrix of binary data; (b) scanning the predetermined area in a direction which is parallel to the original direction of scanning to search for the presence of binary indicia like binary ones along the predetermined number of search scans to generate search results for each of the search scans, with a binary one indicating the presence of data; (c) ANDing the search results of preselected search scans to generate AND-scans; (d) ORing preselected AND-scans to generate OR-scans; and (e) using the OR-scans to define the search regions in which to look for straight lines which are perpendicular to the original direction of scanning.

11 Claims, 4 Drawing Sheets

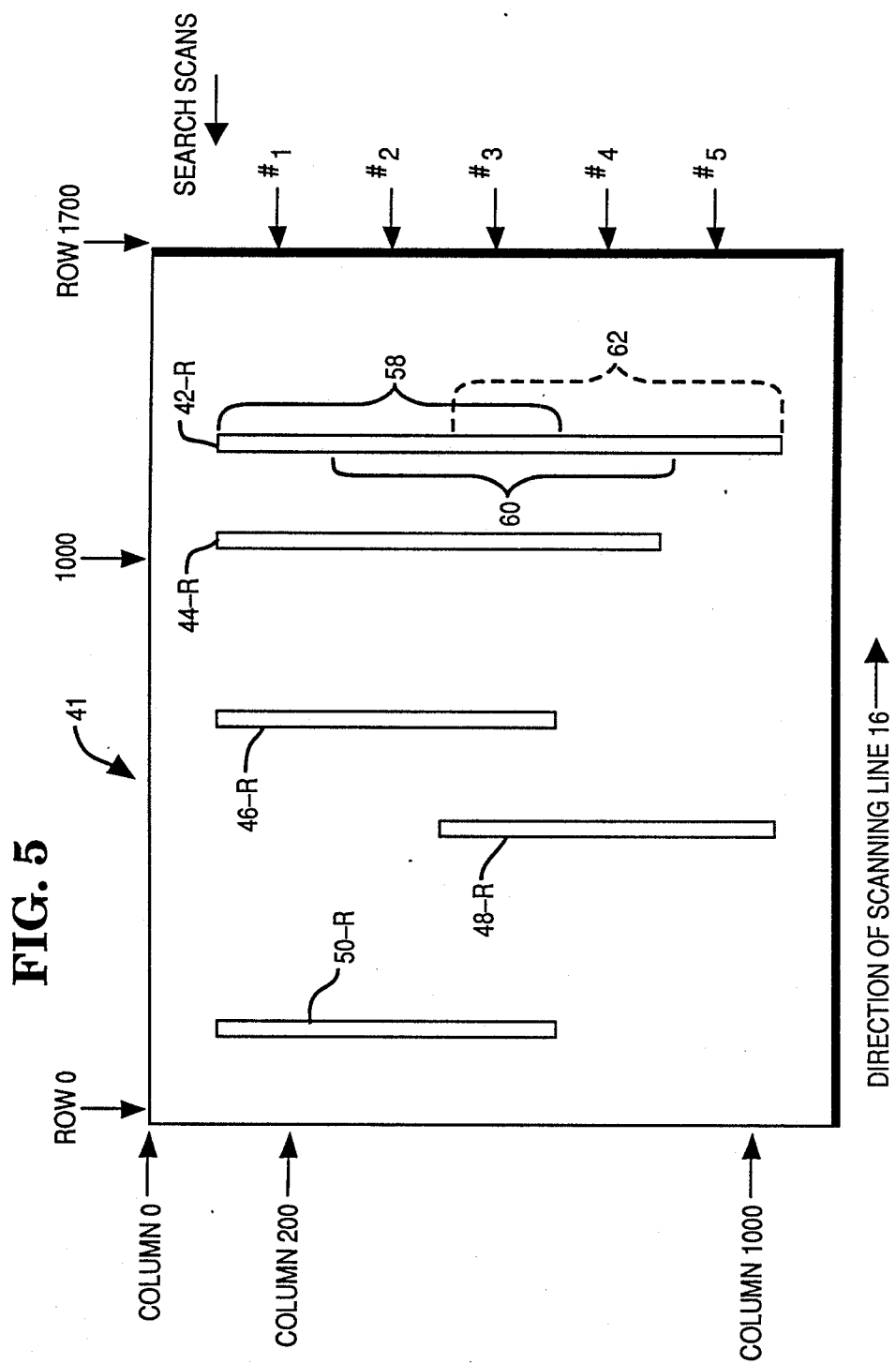

METHOD OF SEARCHING BINARY IMAGES TO FIND SEARCH REGIONS IN WHICH STRAIGHT LINES MAY BE FOUND

BACKGROUND OF THE INVENTION

(1) Field of the Invention

This invention relates to a method of searching a matrix of binary data to find search regions in which long straight lines may be found, with the straight lines being those which are perpendicular to the original direction of scanning which produced the matrix of binary data.

(2) Description of the Related Art

There is a trend to process documents of various types by imaging the documents so as to obtain image data of the documents. For example, a document or item is moved past a scanning device (or a scanning device is moved over the item) to obtain image data of the item. The image data consists of a plurality of pixels or picture elements obtained at a scanning line associated with the scanning device. The pixels associated with successive scans obtained at the scanning line comprise the matrix of image data associated with the item or document. The image data is processed by conventional circuitry to eliminate "noise" and the like, and to also threshold the image data to produce a binary matrix of data. For example, each pixel of image data, which may comprise an eight bit gray scale value which is obtained from the scanning line, is reduced, by thresholding, to a binary "1" or a binary "0". A binary 1 may indicate the presence of data, while a binary 0 indicates the background or the absence of data. Thus, the image data about a document is thresholded to a matrix of binary data.

One of the problems with using a matrix of binary data is that it is often difficult to find what is looked for within the matrix. In other words, there may be a lot of extraneous binary data in the matrix in addition to what is sought. For example, one may look for certain lines in the matrix of data. In this regard, long lines which are parallel to the original direction of scanning are not difficult to find, whereas, long lines which are perpendicular to the original scan line are difficult to find. For example, if the scanning is done along successive columns, long lines which are parallel to the direction of scanning are easy to find. In other words, a long string of binary ones will be found in a particular column or adjacent columns, indicating the presence of a long line. However, if the long line is perpendicular to the original scanning direction, it means that a portion of the line will extend over many columns of data, making the search for this long line difficult.

SUMMARY OF THE INVENTION

An advantage of the present invention is that it facilitates the location of long lines within a matrix of binary pixels associated with an image of a document.

Another advantage of the present invention is that it facilitates the identification of certain documents. For example, certain lines appearing on certain locations of the document may be indicative of that document being a particular type of business form. The lines may be part of a general quadrilateral box or area, for example, located on the document. These long lines may be parts of "boxes" on a form, "underlines", or "separators".

Finding the long lines facilitates optical character recognition (OCR) in that the long lines are generally removed first before character recognition is attempted.

The preferred method according to this invention relates to a method of searching a matrix of binary data to find search regions in which straight lines may be found, with the straight lines being those which are perpendicular to the original direction of scanning which produced the matrix of binary data; said method comprising the steps:

(a) determining a number of search scans to cover a predetermined area of said matrix of binary data;

(b) scanning said predetermined area in a direction which is parallel to said original direction of scanning to search for the presence of binary ones along said number of search scans to generate search results for each of said search scans, with a binary one indicating the presence of data;

(c) ANDing the search results of preselected said search scans to generate AND-scans;

(d) ORing preselected said AND-scans to generate OR-scans; and (e) using said OR-scans to define said search regions in which to look for said straight lines which are perpendicular to the original direction of scanning.

The above advantages, and others, will be more readily understood in connection with the following specification, claims, and drawing.

BRIEF DESCRIPTION OF THE DRAWING

FIG. 5 is a schematic diagram showing certain search regions used in locating long lines.

DESCRIPTION OF THE PREFERRED EMBODIMENT

Figure 1:
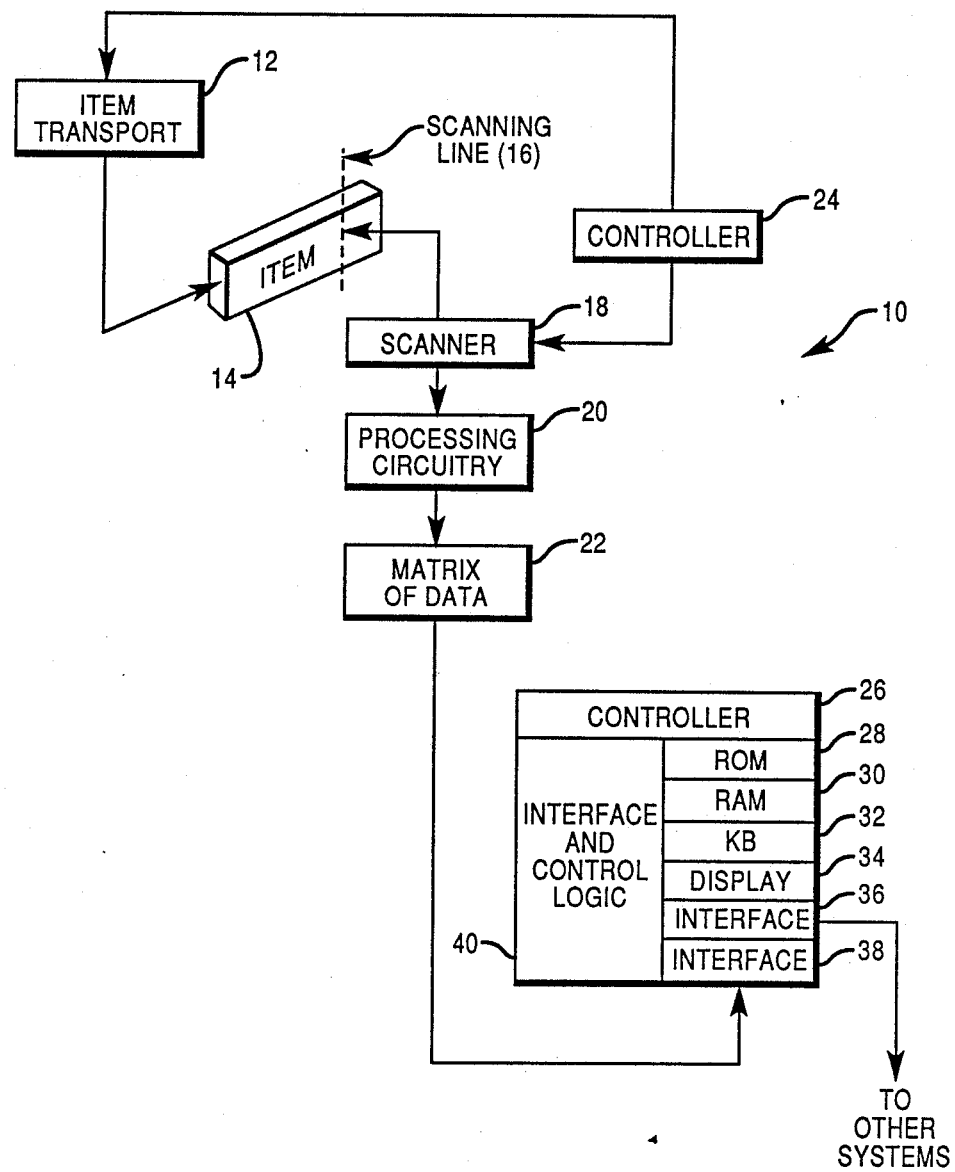
FIG. 1 is a general schematic diagram showing an apparatus which may be used in carrying out this invention.

As previously stated, this invention relates to a process for searching a matrix of binary pixel data associated with a document so as to find search regions in which straight lines may be found, with the straight lines being those which are perpendicular to the original direction of scanning which produced the matrix of binary data. Once the search regions are found, they can be used to focus the searches within the search areas to locate the long lines. In order to describe the process, it is useful to refer to FIG. 1 which shows apparatus 10 which may be used in carrying out the invention.

The apparatus 10 includes an item transport 12 which moves an item, like a document 14, towards a scanning line 16 where the document 14 is imaged by a scanner 18 as is conventionally done. The scanner 18 produces successive scan lines or columns of pixel data or pixels as the item 14 is moved in reading relationship therewith. The scanner 18 could also be a hand held scanner, for example, which is moved over a stationary document to effect the reading. From the scanner 18, the successive columns of pixel data are processed to minimize noise associated with the pixels and to threshold the pixels into a binary "1", for example, which may represent the presence of data and a binary "0" which may represent the absence of data. This processing is effected by conventional circuitry shown only as processing circuitry 20.

The output of the processing circuitry 20 is a matrix 22 of binary data or pixels (not compressed) which corresponds to the image of the associated document 14. The matrix 22 of binary data may include about 1700 pixels per column with a resolution of 200 pixels per inch, for example, as just one illustration of a document whose width is about 8½ inches wide. Naturally, the overall size of the matrix 22 of data is dependent upon a particular application; however, the particular size is not important to an understanding of this invention nor to the operation thereof. The scanner 18 and the item transport 12 may be controlled by a separate controller 24, for example, or they may be controlled by the controller 26 which is used to process the matrix 22 of data or pixels.

The controller 26 (FIG. 1) is a conventional controller which may be used to process the matrix 22 of pixels according to this invention. The controller 26 includes a read only memory (ROM 28), a random access memory (RAM 30), a key board (KB) 32, a display 34, interfaces 36 and 38, and interface and control logic 40 which is used to interconnect all the components shown in a conventional manner. The form of the controller 26 shown is used to simply facilitate a discussion of the operation of the controller 26; the actual form of the controller 26 is different from that shown.

As alluded to earlier herein, when one has a matrix of binary pixels which corresponds to the image of a document, like 14, for example, it is sometimes difficult to find out where in the matrix the particular information or data sought is located. As noted earlier herein, it is difficult to find long lines which are perpendicular to the direction of scanning. For example, assume that the matrix 41 of binary pixels shown in FIG. 2 (similar to the matrix 22 of binary data shown in FIG. 1) corresponds to the image of a document 14. Assume, also, that the scanning is done along the columns as shown in FIG. 2. The entire image shown in FIG. 2 can be expressed as a number of columns of data and a number of rows of data or pixels which are either binary 1's or 0's in the example being described. For example, column 0 may start at the top right side of the document 14, as viewed in FIG. 1, while column 1,000 approaches the left side of the document 14. Correspondingly, row 0 appears at the top of the document 14, while row 1700 approaches the bottom of the document 14, as viewed in FIG. 1. Accordingly, the upper left hand corner of the matrix 41 (FIG. 2) corresponds to the upper right hand corner of the document 14 shown in FIG. 1. Naturally, the columns and rows may be reversed, depending upon how the documents are scanned, for example.

The lines and printing shown in FIG. 2 represent the binary ones of data which comprise the matrix 41, with the binary zeros comprising the background of the document 14. It is the lines like lines 42, 44, 46, 48, and 50, for example, which are difficult to find; these are the lines which are perpendicular to the direction of scanning line 16.

The first step in the process or method according to this invention is to determine a number of search scans which will be used to search the matrix 41 of binary data. These search scans will be used to search the matrix 41 in a direction which is parallel to the scanning line 16 which is also shown on FIG. 2. The binary ones found in these search scans, after some processing to be later described herein, may be indicative of the long lines being sought.

There are certain parameters which are used in the process of this invention; these are N, P, Q, and L. These parameters are described as follows:

1. "N" relates to the number of search scans which are selected to scan the matrix 41 at equal intervals thereon. In the embodiment described, N is equal to 5, with search scans #1 through #5 being shown in FIG. 2. "N" is chosen so that the spacing between successive scans is much less than the minimum length of the line to be detected. Lines like 42 and 44 are the long lines which are to be found.

2. "P" relates to the number of AND-scans which are included in a particular AND-set. In the embodiment described, the number of AND-scans included in an AND-set is two. The And-scans relate to the processing of the scans #1 through #5 (FIG. 2) as will be described hereinafter. For example, scan #1 and scan #2 in FIG. 2 are considered an AND-set. P is selected so that the AND-set spans a distance which is somewhat less than the minimum line length anticipated. There are N−P+1 AND-sets.

3. The scans in each AND-set are logically ANDed to produce a single "AND-scan" for each AND-set. For example, scan #1 and scan #2 in FIG. 2 (which comprise an AND-set) are ANDed to produce AND-scan-1 shown in FIG. 3. There are N−P+1 "AND-scans" within the embodiment described. Notice from FIG. 2 that there are four "AND-scans", namely AND-scans-#1 through #4.

4. The N−P+1 "AND-scans" are grouped into overlapping sets containing "Q" adjacent AND-scans. In the embodiment described, Q=2. In other words, AND-scan-1 and AND-scan-2 shown in FIG. 4 comprise an "OR-set". Q is chosen so that the distance spanned by the scans is somewhat longer than the maximum line length. There are N−P−Q+2 AND-scan sets in the embodiment described.

Figure 4:
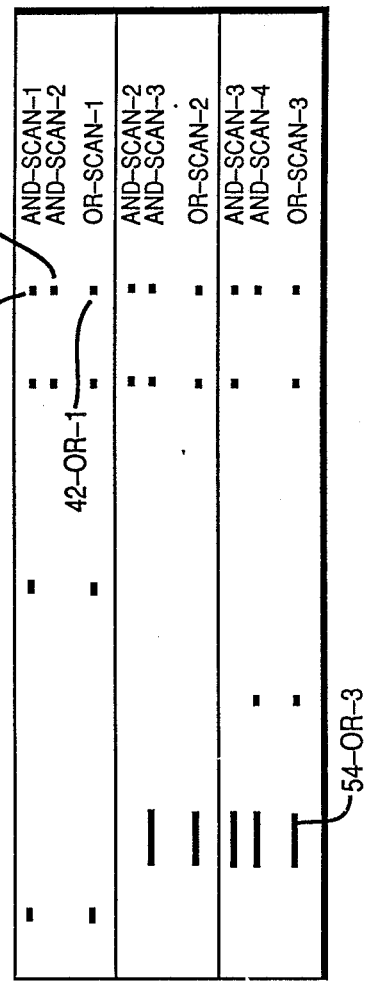
FIG. 4 is a chart showing the results of ORing certain AND-scans shown in FIG. 3.

5. The "AND-scans" making up an "OR-set" are logically "ORed" to produce a single "OR-scan" for each OR-set. For example, AND-scan-#1 and AND-scan-#2 shown in FIG. 4 are logically ORed to generate "OR-scan-1". There are N−P−Q+2 "OR-scans" in the embodiment described.

6. For each run, in each OR-scan, which is not longer than the maximum line thickness L, a search window is created which has dimensions slightly larger than L as measured in the scan direction and spanning the OR-set in a direction which is perpendicular to the scan direction. The set of these search windows is the output of this procedure. This aspect will be more clearly understood in connection with a discussion of FIG. 5.

Before describing certain additional features of this invention, and before describing how certain of the parameters mentioned can be varied to suit particular applications, it appears useful to describe a particular application.

After determining the parameters for using the method of this invention as just described, the next step according to this invention is to scan a predetermined area of the matrix 41 of binary data in a direction which is parallel to the original direction of scanning (scanning line 16). In some cases, the predetermined area may be a portion of the matrix 41, or it may be the entire area of the matrix 41. In the embodiment described, the predetermined area relates to the entire matrix 41. In the example being described, N was equal to five. In this regard, notice that there are five search scan lines shown in FIG. 2, namely, search scan #1 through #5.

Figure 2:
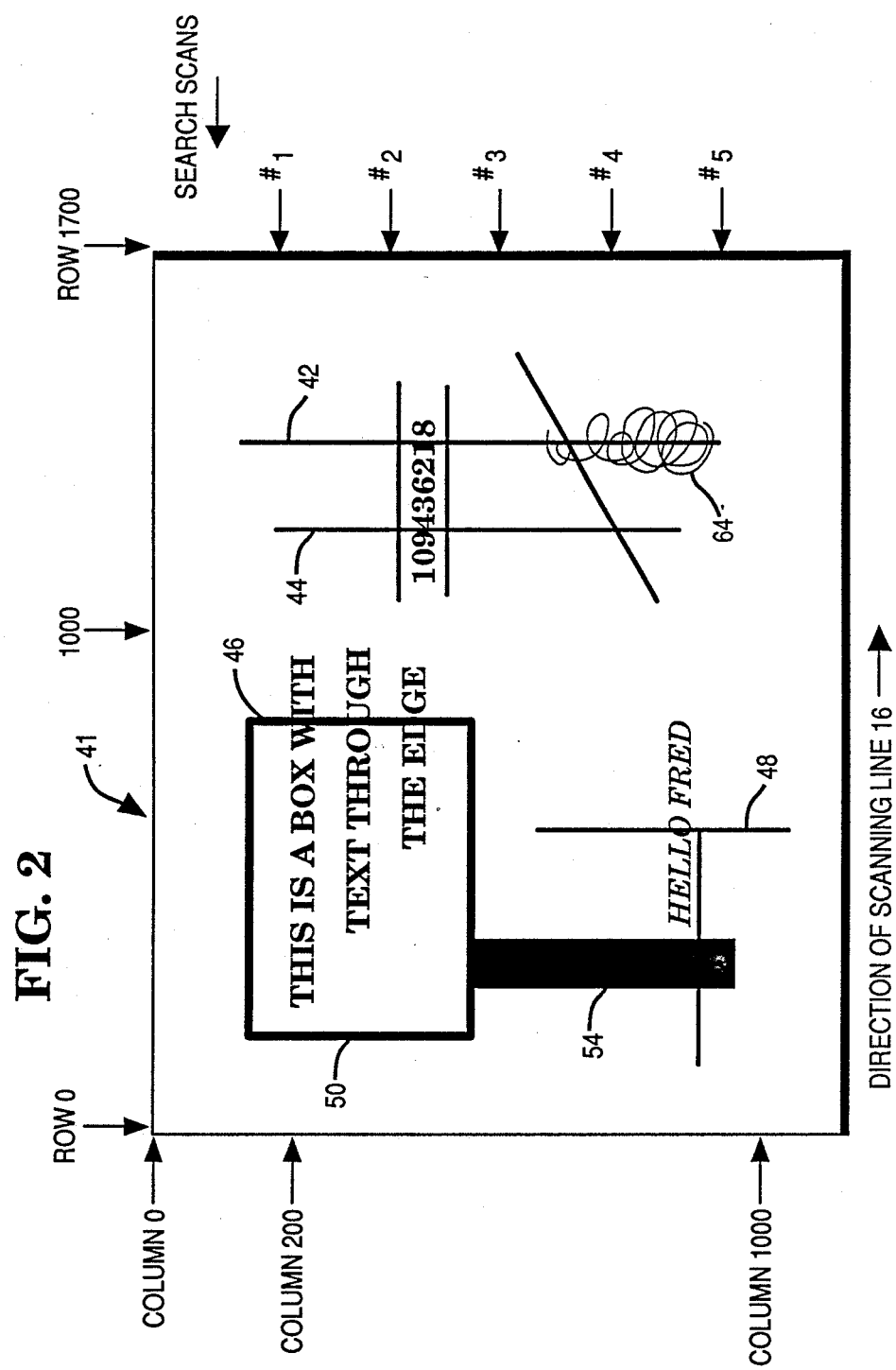
FIG. 2 is a schematic diagram showing how certain search scans are used in the search for long lines which are perpendicular to the direction of the original scanning which was performed to produce the matrix of binary data shown.
Figure 3:
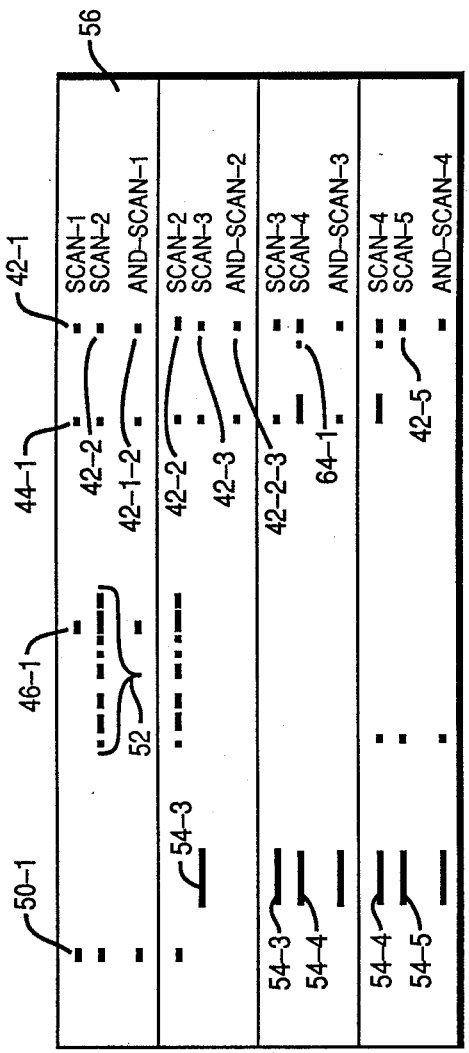
FIG. 3 is a chart showing the results of certain search scans associated with the method of this invention, and also showing certain AND-scans resulting from ANDing certain search scans.

The search results for the search scans #1 through #5 shown in FIG. 2 are shown as scans-1 through 5, respectively, in FIG. 3. To provide some correlation, notice that binary data 42-1 shown in FIG. 3 for scan-1 corresponds to a portion of the line 42 shown in FIG. 2. Similarly, binary data 44-1 corresponds to a portion of line 44. Notice that lines 46 and 50 are thicker than the lines 42 and 44; correspondingly, the associated binary data 46-1 and 50-1 is "wider", as measured along the search scan #1, than the data 42-1 and 44-1 associated with lines 42 and 44-1. Notice that the printing "THIS IS A BOX WITH" and the printing "TEXT THROUGH" shown in FIG. 2 lie between the search scans #1 and #2, and consequently, binary data about this printing does not show up in scan-1 and scan-2 shown in FIG. 3. Notice however, that a portion of the printing "THE EDGE" shown in FIG. 2 does lie within search scan #2; consequently, this shows up as the binary data included in the bracket 52 (FIG. 3). Notice also, that the thick line 54 shows up as binary data 54-3, 54-4 and 54-5 (FIG. 3) associated with the scans-3, 4, and -5.

The next step in the method according to this invention is to AND certain of the scans-1 through -5 shown in FIG. 3 in the following manner. In the embodiment described, the scans-1 and -2 which comprise an AND-set are ANDed together to generate the AND-scan-1 shown on line 56 in FIG. 3. Notice from FIG. 3 that the digital data 42-1-2 is the result of ANDing digital data 42-1 and 42-2. Scans-2 and -3 are similarly ANDed together to generate AND-scan-2. Notice also, that the digital data 42-2-3 is the result of ANDing digital data 42-2 and 42-3. Scans-3 and -4 are ANDed together to generate AND-scan-3, and scans-4 and -5 are ANDed together to generate AND-scan-4. Naturally, if more than five search scans were utilized in a particular embodiment, this process would be repeated for the remaining scans to generate the remaining AND-scans. Notice that there was also some overlapping in the ANDing operation, i.e., scan-2 is used to generate both AND-scan-1 and AND-scan-2.

The next step in the method of this invention is to "OR" the AND-scan-1 through AND-scan-4 data in the embodiment described. For example, the digital data (actually binary 1s) associated with the AND-scan-1 and AND-scan-2 are ORed together to generate the "OR-scan-1" shown in FIG. 4. A function of the OR operation is to catch a long line which may be discontinuous at certain points along its length. The AND-scan-1 and the AND-scan-2 comprise an "OR set" alluded to earlier herein. AND-scan-2 and AND-scan-3 are ORed together to generate OR-scan-2, and correspondingly, AND-scan-3 and AND-scan-4 are ORed together to generate OR-scan-3. This process is repeated for additional AND-scans which may appear in a particular application to be processed. Again, there is some overlapping in the method in that the AND-scan-2 is used in the generation of OR-scan-1 and OR-scan-2.

The ANDing and ORing operations described may be carried on within the controller 26 shown in FIG. 1. Notice that the binary data 42-1-2 and 42-2-3 associated with AND-scan-1 and AND-scan-2, respectively, are combined by the ORing operation to generate the binary data 42-OR-1 which is associated with the OR-scan-1 shown in FIG. 4. OR-scan-2 and OR-scan-3 are generated in the same manner as described.

After the OR-scans-1 through -3 are generated as described, they are used to define search regions in which the controller 26 may look to find the long lines, like lines 42 and 44 for example, which are perpendicular to the direction of scanning line 16. In this regard, the controller 26 keeps a record of the row and column positions for the binary data derived from the search scans #1 through #5 as discussed in relation to FIGS. 2–4. This means that the digital data 42-OR-1 (FIG. 4) is derived from the AND-scan-1 and the AND-scan-2, which in turn, are derived from scan-1, scan-2 and scan-3 as previously described. The controller 26 then extends the search region associated with OR-scan-1 by extending it to cover a distance including search scans #1–#3 and a little distance on each side of search scan #1 and search scan #3 as shown by bracket 58 shown in FIG. 5. Correspondingly, OR-scan-2 extends at least over a distance including search scans #2–#4 as indicated by bracket 60. And, OR-scan-3 extends at least over the distance indicated by dashed bracket 62. The location of the binary data 42-1 from scan-1 and the location of binary data 42-5 from scan-5 shown in FIG. 4 are used to establish the row limits for the search region 42-R shown in FIG. 5. Search region 42-R (FIG. 5) is made slightly wider than that warranted by the width of the data, like 42-1 (FIG. 3), itself, so as to provide a rectangular search region as shown to make sure that line 42 shown in FIG. 2 is included in the search region 42-R. The remaining search regions 44-R, 46-R, 48-R and 50-R shown in FIG. 5 are similarly determined, and they correspond to the long lines 44, 46, 48, and 50, respectively, shown in FIG. 2. The search regions, like 42-R, are then used to locate the long lines which are perpendicular to the scanning direction or scanning line 16.

Notice that a search region for the wide line 54 shown in FIG. 2 is not included in FIG. 5. The digital data, like 54-OR-3 shown in FIG. 4, is too wide to be indicative of a narrow line; consequently, it is discarded by the controller 26 instead of being used by it to create a search region as described. Notice, also, that squiggle or illegible scrawl 64 shown in FIG. 2 and shown as 64-1 in FIG. 3 is eliminated in AND-scan-3 shown in FIG. 3.

The procedure, just described, can be adjusted for different applications by changing the various parameters discussed earlier herein. For example:

1. A large value of N, as discussed earlier herein, allows the detection of short lines.

2. A small value of N allows only long lines to be detected.

3. Similarly, large values of P cause only long solid lines to be detected.

4. Small values of P are useful in detecting short, broken lines.

5. Large values of Q result in long search windows for long lines or collinear short lines.

6. Small values of Q result in short search windows for short lines or parts of longer lines.

7. Large values of L will result in thick and thin lines being detected.

8. Small values of L will result in only thin lines being detected.

What is claimed is:

1. A method of searching a matrix of binary data to find search regions in which straight lines may be found, with the straight lines being those which are perpendicular to the original direction of scanning which produced the matrix of binary data; said method comprising the steps:
   (a) determining a number of search scans to cover a predetermined area of said matrix of binary data;
   (b) scanning said predetermined area in a direction which is parallel to said original direction of scanning to search for the presence of binary ones along said predetermined number of search scans to generate search results for each of said search scans, with a binary one indicating the presence of data;
   (c) ANDing the search results of preselected said search scans to generate AND-scans;
   (d) ORing preselected said AND-scans to generate OR-scans; and
   (e) using said OR-scans to define said search regions in which to look for said straight lines which are perpendicular to the original direction of scanning.

2. The method as claimed in claim 1 in which said determining step is effected by considering the length of the straight lines to be found.

3. The method as claimed in claim 2 in which said ANDing step is effected by ANDing adjacent said search scans.

4. The method as claimed in claim 3 in which said ORing step is effected by ORing adjacent said AND-scans.

5. The method as claimed in claim 1 in which said ANDing step is effected by ANDing at least two adjacent said search scans.

6. The method as claimed in claim 5 in which said ORing step is effected by ORing at least two adjacent said AND-scans.

7. The method as claimed in claim 6 in which said using step is effective for defining generally rectangular search regions.

8. A method of searching a matrix of binary data to find search regions in which straight lines may be found, with the straight lines being those which are perpendicular to the original direction of scanning which produced the matrix of binary data; said method comprising the steps:
   (a) determining a number of search scans to cover a predetermined area of said matrix of binary data;
   (b) scanning said predetermined area in a direction which is parallel to said original direction of scanning to search for the presence of binary ones along said predetermined number of search scans to produce search results, with a binary one indicating the presence of data;
   (c) ANDing the search results of a first and second of said search scans to generate an AND-scan #1;
   (d) ANDing the search results of said second search scan and a third of said search scans to generate an AND-scan #2;
   (e) ANDing the search results of said third search scan and a fourth of said search scans to generate an AND-scan #3;
   (f) repeating steps (c), (d), and (e) for the remaining search scans as exemplified in steps (c), (d), and (e) to generate remaining AND-scans;
   (g) ORing AND-scan #1 and AND-scan #2 to generate OR-scan#1;
   (h) ORing AND-scan #2 and AND-scan #3 to generate OR-scan #2;
   (i) repeating steps (g) and (h) for the remaining AND-scans as exemplified in steps (g) and (h) to generate remaining OR-scans;
   (j) using said OR-scans #1 and #2 and said remaining OR-scans to define search regions in which to look for said straight lines which are perpendicular to the original direction of scanning.

9. The method as claimed in claim 8 in which said determining step is effected by considering the length of the straight lines to be found.

10. The method as claimed in claim 9 in which said ANDing steps (c), (d), and (e) are effected upon adjacent search scans.

11. The method as claimed in claim 10 in which said ORing steps (g) and (h) are effected upon adjacent sad AND-scans.

* * * * *